United States Patent [19]

Golinelli et al.

[11] Patent Number: 4,473,951
[45] Date of Patent: Oct. 2, 1984

[54] GAUGING HEAD FOR CHECKING DIMENSIONS OF WORKPIECES

[75] Inventors: Guido Golinelli, Bologna; Narciso Selleri, Monteveglio, both of Italy

[73] Assignee: Finike Italiana Marposs S.p.A., S. Marino di Bentivoglio, Italy

[21] Appl. No.: 515,136

[22] Filed: Jul. 19, 1983

[30] Foreign Application Priority Data

Mar. 9, 1983 [IT] Italy .................................. 3358A/83

[51] Int. Cl.³ .............................................. G01B 7/12
[52] U.S. Cl. .................................. 33/143 L; 33/149 J; 33/178 E
[58] Field of Search .............. 33/143 L, 149 J, 147 N, 33/147 L, 148 H, 174 L, 174 P, 174 Q, 178 E, 172 E, 169 R

[56] References Cited

U.S. PATENT DOCUMENTS

| | | | |
|---|---|---|---|
| 3,122,838 | 3/1964 | Uhlig | 33/172 E |
| 3,345,753 | 10/1967 | Giardino | 33/172 E |
| 3,755,909 | 9/1973 | Asand et al. | 33/143 L |
| 3,863,350 | 2/1975 | Solaroli | 33/169 R |
| 3,922,792 | 12/1975 | Ito | 33/149 J |
| 3,962,792 | 6/1976 | Stépánek et al. | 33/143 L |
| 4,231,158 | 11/1980 | Possati | 33/143 L |
| 4,238,886 | 12/1980 | Brown | 33/149 J |
| 4,274,207 | 6/1981 | Flair | 33/143 L |
| 4,279,079 | 7/1981 | Gamberini et al. | 33/149 J |
| 4,291,466 | 9/1981 | Beth et al. | 33/148 H |
| 4,437,239 | 3/1984 | Possati | 33/143 L |

FOREIGN PATENT DOCUMENTS 2,057,688 4/1981 United Kingdom .

Primary Examiner—Willis Little
Attorney, Agent, or Firm—Stevens, Davis, Miller & Mosher

[57] ABSTRACT

A gauging head, for checking linear dimensions of workpieces, comprises a casing; two movable arms, pivotable about pins fixed to the casing, and carrying feelers for contacting the workpiece to be checked; two position transducers operatively coupled to the movable arms; a second pair of arms pivotable about the pins; and zero-setting devices. The zero-setting devices include two members coupled to a shaft rotatable by a control lever. In a first position of the control lever the members are locked and the gauging head is in gauging condition. In a second position of the control lever the members are unlocked and can translate along the shaft permitting to carry out the zero-setting operation of the head because the two movable arms and the second pair of arms engage the members in such a way that the arms can rotate about the pins while maintaining a determined setting of the transducers.

17 Claims, 5 Drawing Figures

GAUGING HEAD FOR CHECKING DIMENSIONS OF WORKPIECES

BACKGROUND OF THE INVENTION

1. Field of the Invention

The present invention relates to a gauging head for checking linear dimensions of workpieces, including a casing, a gauging arm movable with respect to the casing, a feeler fixed to an end of the gauging arm for contacting the workpiece to be checked, a transducer with at least two elements for providing a signal responsive to the position of the gauging arm and mechanical zero-setting means having movable stop means adapted to be arranged in a first position for defining a determined mutual position of the two transducer elements and in a second position for permitting the mutual displacements of the gauging arm and of at least one element of the transducer.

2. Description of the Prior Art

It is well known that the gauges for checking linear dimensions of mechanical parts may feature very high accuracy and repeatability (e.g. in the micron range), but have normally rather narrow measuring ranges, for example range of some millimeters. The width of the measuring range is basically determined by the transducer. One of the types of transducers more frequently employed is the linear voltage differential transformer (LVDT) transducer, which includes a first element with electric coils and a second element with a core movable with respect to the coils.

In order to utilize the gauges for checking workpieces having dimensions differing by an amount larger than the width of the measuring range of the transducer, the gauges are normally provided with mechanical zero-setting devices.

U.S. Pat. No. 3,863,350 discloses an electronic gauge having a zero-setting device including a replaceable calibrated reference member that permits displacements of the gauging head—having a single feeler—to different positions. Each position of the gauging head defines a relevant zero-setting determined by the calibrated reference member employed.

This technical solution, which permits quick and simple zero-setting operations, may only be used under particular circumstances and requires the availability of several calibrated reference members.

Other known mechanical zero-setting devices permit suitable displacements of one or more elements of gauging heads (e.g. adjustments of the feeler; of an element coupled to the gauging arm and supporting the feeler; of an element of the transducer) thus allowing, in substance, a translation of the measuring range. Gauging heads embodying these features are described in U.S. application Ser. No. 453,108.

It is easily understood that on the one hand it is desirable to have broad measuring ranges in which the gauge performances have the necessary features of accuracy, repeatability and linearity of response and, on the other hand, it is important that the zero-setting device or devices allow zero-setting operations with adjustments of considerable lengths and which are safe, quick and very simple in order that even a poorly skilled operator can carry out the operations with minimum loss of time. Moreover, the possibility of performing the zero-setting operations without any need of auxiliary tools and devices may be important.

These requirements are particularly important for in-process gauging heads for grinders; these gauging heads can check the dimensions (normally internal and/or external diameters, thickness, axial dimensions) of workpieces during grinding operations. These gauging heads also require suitable characteristics with regard to sturdiness, resistance to impacts, minimum sensitivity to vibrations etc.

U.S. Pat. No. 3,122,838 discloses a gauging head for bench checks including a movable gauging arm comprised of two elements connected by a friction screw. The mutual angular position of the two elements can be adjusted by acting on the screw, thus carrying out a rough zero-setting. Moreover, if the element carrying the feeler is subjected to a rather violent accidental impact, this element may rotate with respect to the other element, thus preventing breakages of the rather delicate components of the gauging head.

A technical solution substantially identical to the preceding one is used in the in-process gauging head for checking workpieces during grinding operations described in U.S. Pat. No. 4,238,886. This gauging head, for checking external diameters, comprises two movable gauging arms carrying at an end relevant feelers and at the other end the two elements of a position transducer. Each gauging arm is comprised of two sections coupled by a frictional device. The zero-setting operation is carried out by locking the two sections of the gauging arms which carry the two transducer elements—in such a way that these elements have a determined mutual position—, by acting on the other two sections for displacing the feelers into contact with the workpiece to be checked and by unlocking again the first two sections.

Of course, the frictional devices must offer a rather low resistance, for permitting manual displacements of the two sections of the gauging arms in order that the feelers contact the workpiece, and at the same time a resistance sufficiently high to prevent sliding during the gauging operation.

The two gauging heads described in U.S. Pat. Nos. 3,122,838 and 4,238,886 have the drawback that impacts against the feelers—or the sections of the gauging arms which carry the feelers—or vibrations and other stresses, can cause small sliding displacements of the frictional devices, or in any way sliding displacements not easily perceivable, thus producing loss of the zero-setting condition, which may pass unnoticed to the operator. In this case the operator does not intervene and continues relying on the measurements provided by the gauging head, which as a matter of fact are wrong. If the gauging head signal is utilized for controlling the operation cycle of a grinding machine, this may bring about the obtainment of workpieces having final dimensions out of tolerance.

SUMMARY OF THE INVENTION

The object of the present invention is to provide a gauging head that, while allowing simple, fast and safe zero-setting operations, has constructional features without the drawbacks of the conventional gauges.

This object, as well as further objects and advantages are achieved by a gauging head of the type set forth, wherein the zero-setting means further comprise control and guide means for carrying out the zero-setting operation by displacing the gauging arm and the transducer with respect to the casing, while maintaining substantially unchanged said mutual position and the position of the two transducer elements with respect to the gauging arm.

BRIEF DESCRIPTION OF THE DRAWINGS

The invention shall be described in further detail with reference to the accompanying drawings, which are given solely by way of illustration and not of limitation and in which.

DESCRIPTION OF THE PREFERRED EMBODIMENT

Figure 1:
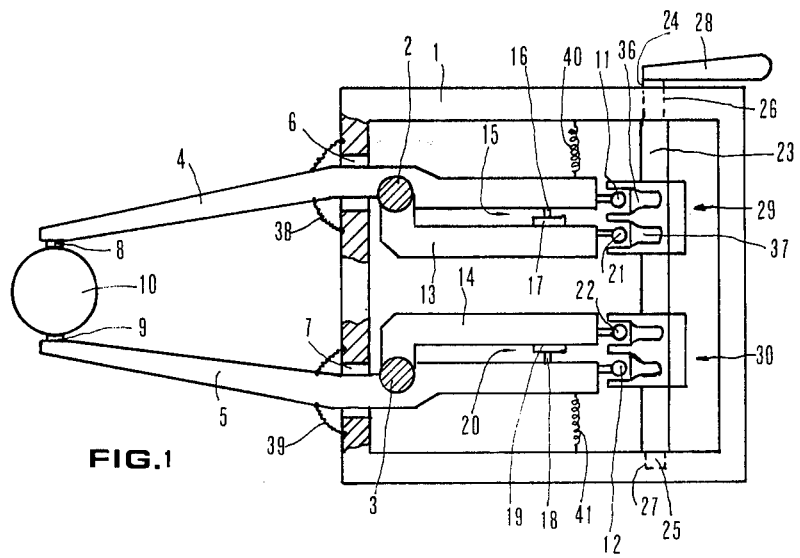
FIG. 1 is a diagrammatic partially sectioned side view of a gauging head with two measuring feelers, shown during the gauging operation of an external diameter, according to a preferred embodiment of the invention.
Figure 2:
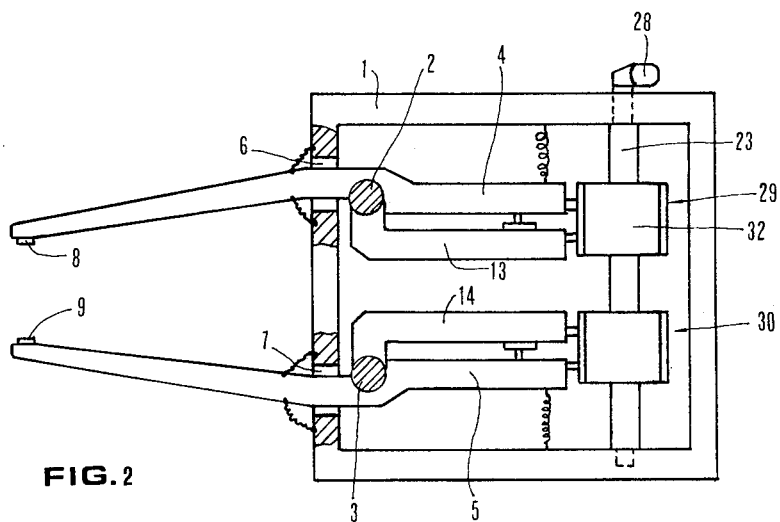
FIG. 2 shows, in diagrammatic form, the gauging head of FIG. 1 during a phase of the mechanical zero-setting operation.

The electronic gauging head shown in FIGS. 1 and 2 comprises a gauging head casing or external support 1, also acting as a protection device, having substantially the shape of a box with an open side and a closure cover, not visible in FIGS. 1 and 2.

Mounting means including two pins 2 and 3 are fastened to casing 1 as will be described hereinafter with reference to FIG. 5.

Two movable measuring or gauging arms 4 and 5 are respectively mounted on pins 2 and 3 so as to be rotatable about them, as will be described later.

Arms 4 and 5 pass through openings 6 and 7 of casing 1 and carry, at their ends external with respect to the casing, relevant feelers or contacts 8 and 9 adapted to contact the surface of the workpiece 10 the external diameter of which, in the embodiment according to FIG. 1, has to be checked.

Small balls 11 and 12 are fixed at the ends of arms 4 and 5 located within casing 1.

Two ends of two further arms or elements 13 and 14—completely located within casing 1—are pivotally coupled to pins 2 and 3; the coupling of elements 13 and 14 is obtained through frictional means, as it will be explained hereinbelow.

Two elements of a position transducer 15, of the LVDT type, are fixed to arm 4 and element 13, respectively; in particular, a stem 16 carrying at the free end a magnetic core, not visible, is fixed to arm 4 and a support 17, housing the coils of the differential transformer, is fixed to element 13.

Similarly, a stem 18 carrying at the free end another magnetic core, not visible, is fixed to arm 5 and a support 19, housing the coils of the differential transformer of another position transducer 20, is fixed to element 14.

At the free ends of elements 13 and 14, within casing 1, there are fixed relevant small balls 21 and 22 having the same diameters of balls 11 and 12.

A control and guide element, or shaft, 23, having polygonal, i.e. square cross-section, is rotatably coupled to casing 1, by means of cylindrical sections 24 and 25 rotatable in corresponding holes 26 and 27 of casing 1.

A control lever 28, external with respect to casing 1, is fixed at the end section 24 of shaft 23. Stop—or reference—and guide means include two members or blocks 29 and 30, substantially identical, which are slidably coupled to shaft 23; the members 29 and 30 are slidable along the direction defined by the geometric axis of shaft 23, this axis being perpendicular to the axes of pins 2 and 3.

Figure 3:
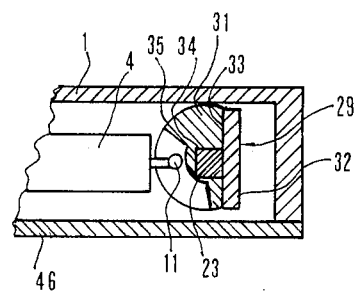
FIG. 3 is a horizontal cross-section showing a detail of the gauging head of FIGS. 1 and 2, in particular a portion of a mechanical zero-setting device.
Figure 4:
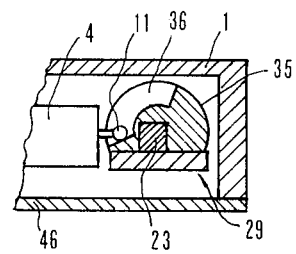
FIG. 4 is a horizontal cross-section showing the detail of FIG. 3 during a phase of the mechanical zero-setting operation.

As it is shown in FIGS. 3 and 4, member 29 comprises two disassemblable elements 31 and 32. Element 31 has substantially the shape of a cylinder portion and element 32 has the shape of a plate which can be screwed to a flat side 33 of element 31. Therefore, member 29 defines a longitudinal through hole, having polygonal, i.e. square cross-section, which by matching with shaft 23 permits the translational displacement of member 29 along shaft 23.

The cylindrical portion of element 31 is offset with respect to the axis of hole 34 and shaft 23, so as to define a locking cam 35.

Element 31 has two slots 36 and 37 housing balls 11 and 21, respectively. As it is shown in FIGS. 1,3 and 4, slots 36 and 37 have a first section of larger width, so as to house balls 11 and 21 with a considerable longitudinal play (along the axis of shaft 23); a second section of smaller width—slightly longer than the diameter of balls 11 and 21—; an intermediate interconnecting section; and two end surfaces for limiting the rotatory displacements of members 29 and 30 and thus of shaft 23.

Openings 6 and 7 are sealed by bellows 38 and 39 coupled to casing 1 and arms 4 and 5. Gaskets and/or sealing material seal all the other openings of casing 1, including an opening, not shown, permitting the passage of the cables, not shown, which connect transducers 15 and 20 to a supply, detecting and indicating unit, also not shown. Accordingly, the gauge is completely sealed.

Return springs 40 and 41 have their ends fixed to arms 4 and 5 and to casing 1; these springs 40 and 41 control rotation of arms 4 and 5 along relevant measurement directions and thus urge feelers 8 and 9 against workpiece 10.

Figure 5:
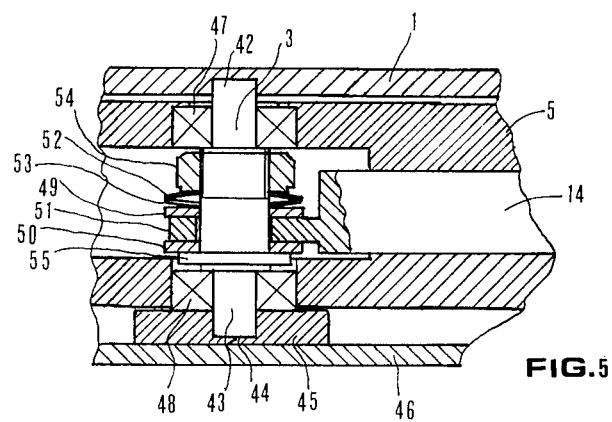
FIG. 5 is a horizontal cross-section relating to a constructional detail of the gauging head of FIGS. 1 and 2, namely a supporting device for the movable arms of the gauging head, shown with an enlarged scale with respect to FIGS. 1 to 4.

As shown in FIG. 5, pin 3 has an end 42 directly fixed to a wall of the box portion of casing 1 and another end 43 arranged in a hole 44 of a plate 45 which is in turn fixed to casing 1, in a way not shown. End 43 is adjacent to the plate or closing cover 46 of casing 1.

Onto pin 3 there are keyed the inner rings of ball bearings 47 and 48 including outer rings rigidly fixed to two adjacent sides of movable arm 5. Therefore movable arm 5 can rotate, together with the outer rings of ball bearings 47 and 48, about the geometric axis of pin 3.

A frictional device coupling arm 14 to pin 3 comprises: two bronze washers 49 and 50 arranged at the sides of a perforated end 51 of arm 14 permitting the passage of pin 3; two cup shaped springs 52 and 53 arranged at the sides of washer 49; and a ring nut 54 screwed onto pin 3. Washer 50 abuts against a stop ring 55 fixed to pin 3.

By screwing down ring nut 54 it is possible to adjust the preloading of the frictional device for suitably determining the force required for controlling rotation of arm 14 about the axis of pin 3.

Similar elements are associated with arms 4 and 13.

The operation of the gauging head shall now be described, particularly as far as the zero-setting procedure is concerned.

In gauging condition members 29 and 30 cannot displace with respect to shaft 23 because their locking cams are resiliently gripped against a wall of casing 1, as shown in FIG. 3 for the cam 35 of the frictional zero-setting device associated with movable arm 4. Moreover, ball 11 is arranged within the section of slot 36 having larger width and therefore movable arm 4 actuated by spring 40, may perform limited measurement displacements about the axis of pin 2. The amount of these displacements is determined by the contact of ball 11 against the abutment sides of slot 36.

Ball 21, too, is located within the section of slot 37 having larger width, but arm 13 cannot displace because it is frictionally locked by the relevant frictional device 49-55 and it is not coupled to arm 4.

In this gauging condition, if movable arm 4 is subject to an accidental impact, this does not damage the more delicate elements (like the transducers) of the gauging head. In fact, the components of the impact forces incident with the axis of pin 2 and the components parallel to this axis do not cause harmful consequences, in view of the high sturdiness of the elements supporting arm 4. Similarly, the forces originating moments for rotation of arm 4 about pin 2 discharge onto casing 1 through ball 11 and block 29, as well as through the ball bearings coupled to arm 4 and through pin 2. Similar remarks apply to measuring arm 5.

Therefore all the elements concerned, being very sturdy, do not suffer significant deformations. Moreover, it must be considered that the impact does not cause transmission of significant stresses to arms 13 and 14 and therefore does not change the zero-setting condition of the gauging head.

Possible very violent impacts, which are of course noticed by the operator, can cause permanent deformations of movable arms 4 and 5. In this case the operator shall have to check the zero-setting condition and, if necessary, he will straighten movable arms 4 and 5 and perform a new zero-setting operation.

The zero-setting operation is carried out rotating clockwise, by about 120 degrees, lever 28, and thus shaft 23 and blocks 29 and 30, in order to disengage the cams of blocks 29 and 30 from casing 1, as shown in FIG. 4 for cam 35. Then balls 11 and 21 (and similarly balls 12 and 22) locate within the sections of relevant slots 36 and 37 which have smaller width.

Thereafter a master or standard part is arranged in the gauging position (in particular, between the centers of a grinding machine) and arms 4 and 5 are manually displaced to bring feelers 8 and 9 in contact with the part. Rotation of arms 4 and 5 is allowed because blocks 29 and 30, urged by balls 11 and 12, may translate along shaft 23. The translation of blocks 29 and 30 causes, since balls 21 and 22 contact the abutment sides of the relevant slots 37, rotational displacements of arms 13 and 14, overcoming the resistance applied by the relevant frictional devices. Under these conditions, the mutual positions of elements 16, 17 and 18, 19 of transducers 15 and 20 do not change substantially and transducers 15 and 20, independently from the positions of arms 4 and 5, substantially provide a determined constant signal.

Thereafter, lever 28 is rotated counterclockwsie, until the cams of blocks 29 and 30 are locked, due to friction and resilient deformation, against casing 1 and balls 11 and 12 are arranged within the larger sections of the relevant slots, so permitting the gauging displacements of arms 4 and 5.

The zero-setting operation is thus completed.

The gauging head can be advantageously used for checking dimensions not only of workpieces having uninterrupted surfaces, but also dimensions of workpieces having splined or generally interrupted surfaces, during grinding operations. In the latter case it may be useful or necessary to dampen the gauging arm displacements by filling casing 1 with a dampening fluid—as teached by U.S. Pat. No. 4,279,079—or by employing two cilinder-piston dampers, as described in U.S. Pat. No. 3,345,753; the elements of the dampers can be fixed to movable arm 4 and arm 13 and, respectively, to movable arm 5 and arm 14.

Since the gauging head comprises two separate position transducers, it is possible to check splined workpieces having an odd number of splines or interruptions. In this case, while a feeler contacts the external surface of the workpiece, the other feeler may be arranged within a spline; the presence of two transducers permits processing of the relevant transducer signals, avoiding measurement errors.

The presence of two transducers also provides the advantage to have available, in any zero-setting condition, a measurement range with a width double with respect to that provided by a gauging head with two movable arms and a single transducer.

Of courcе, the invention may also be applied in gauging heads having a single movable arm: in this case it is sufficient to simplify the gauging head shown in the drawings by eliminating one movable arm, the relevant transducer, etc.

Moreover, it is evident that the gauging head shown in the drawings may also be used, after simple changes, for gauging internal diameters. For this purpose it is sufficient to employ movable gauging arms having a suitable shape, such that the displacements controlled by springs 40 and 41 cause movements of the feelers for approaching the surface of the hole to be checked.

Further possible changes may foresee four distinct parallel pins or rotational axes—for mounting the movable gauging arms and the arms coupled to the frictional devices—as well as different structures for the guide and reference means which define the zero-setting condition of the transducer or transducers while allowing to displace the gauging arms.

Additional changes and variants, equivalent from a functional or constructional point of view, are possible without departing from the scope of the invention.

What is claimed is:

1. A gauging head for checking linear dimensions of workpieces, comprising: a casing; a gauging arm movable with respect to the casing; a feeler fixed at an end of the gauging arm for contacting the workpiece to be checked; a transducer with at least two elements for providing a signal responsive to the position of the gauging arm; and mechanical zero-setting means having movable stop means adapted to be arranged in a first position, for defining a determined mutual position of the two transducer elements, and in a second position for permitting the mutual displacements of the gauging arm and of at least one element of the transducer; wherein the zero-setting means further comprise control and guide means for carrying out the zero-setting operation by displacing the gauging arm and the transducer with respect to the casing, while maintaining substantially unchanged said mutual position and the position of the two transducer elements with respect to the gauging arm.

2. The gauging head according to claim 1, further comprising mounting means for movably mounting the gauging arm with respect to the casing, the mounting means defining an axis and the gauging arm being pivotable about this axis.

3. The gauging head according to claim 2, wherein the zero-setting means comprise a second arm coupled to the casing for pivotal displacements about an axis parallel to the axis defined by the mounting means and frictional means for providing a frictional resistance to the pivotal displacements of the second arm, said two transducer elements being fixed to the gauging arm and the second arm, respectively, the stop means defining, in their first position, a determined mutual position of the gauging arm and the second arm.

4. The gauging head according to claim 3, wherein said mounting means comprise a pin defining the pivoting axes of the gauging arm and the second arm.

5. The gauging head according to claim 4, wherein the control and guide means include a control and guide element fixed to the casing and elongated along a direction perpendicular to said pin, the stop means including a member slidable along the control and guide element, the member having abutment surfaces for cooperating with a second end of the gauging arm and an end of the second arm for defining said determined mutual position of the arms.

6. The gauging head according to claim 5, wherein said control and guide element defines a geometric axis perpendicular to said pin, the member being rotatable about this geometric axis.

7. The gauging head according to claim 6, wherein said member includes a cam adapted to engage the casing for locking the member with respect to the casing.

8. The gauging head according to claim 7, wherein said member defines peripheral slots for housing the second end of the gauging arm and the end of the second arm, the slots defining said abutment surfaces.

9. The gauging head according to claim 8, wherein one of said slots is adapted to house the second end of the gauging arm and has two sections of different width, and sides of the section of smaller width being adapted to engage the second end of the gauging arm for defining said determined mutual position of the arms.

10. The gauging head according to claim 9, wherein the second end of the gauging arm and the end of the second arm include ball elements housed within said slots and adapted to engage said abutment surfaces.

11. The gauging head according to claim 6, wherein said control and guide element includes a shaft rotatable about the geometric axis defined by the same element, the shaft including a portion having a polygonal cross-section, the member defining a hole with polygonal cross-section matching with said portion of the shaft.

12. The gauging head according to claim 6, wherein said casing has substantially a closed shape and said control and guide means include a control lever external to the casing, the lever being coupled to the control and guide element for controlling rotation of this element.

13. The gauging head according to claim 3, wherein the casing has substantially a closed box-shaped structure, the second arm being completely housed within the casing, the end of the gauging arm carrying the feeler being arranged externally with respect to the casing.

14. The gauging head according to claim 1, further including a second gauging arm, movable with respect to the casing; a second feeler fixed at an end of the second gauging arm for contacting the workpiece; and a second transducer with two transducer elements for providing a signal responsive to the position of the second gauging arm; the mechanical zero-setting means including second movable stop means adapted to be arranged in a first position, for defining a determined mutual position of the elements of the second transducer, and in a second position for permitting the mutual displacements of the second gauging arm and of at least one element of the second transducer, said control and guide means permitting displacements of the second gauging arm and of the second transducer, with respect to the casing, while maintaining substantially unchanged said mutual position of the two elements of the second transducer and the position of the two elements of the second transducer with respect to the second gauging arm.

15. A gauge for checking linear dimensions of workpieces, comprising:
   a support;
   a gauging arm;
   mounting means for directly coupling the gauging arm to the support while permitting measurement displacements of the gauging arm with respect to the support;
   a feeler fixed at an end of the gauging arm for contacting the workpiece to be checked;
   a transducer with at least two elements adapted to provide a signal responsive to the position of the gauging arm with respect to the support; and
   a mechanical zero-setting device including stop means movable with respect to the support and adapted to cooperate with the gauging arm, the stop means being displaceable to a first position for defining a determined mutual position of the two transducer elements and to a second position for permitting the mutual displacements of the gauging arm and of at least one element of the transducer, the zero-setting device further including guide means coupled to the support for permitting displacement of the gauging arm, the transducer and the stop means, with respect to the support, while maintaining substantially unchanged said mutual position and the position of the two transducer elements with respect to the gauging arm.

16. A gauge for checking linear dimensions of workpieces, comprising:
   a support casing;
   a first pin and a second pin fixed to the support casing;
   a first movable arm pivotally coupled to the first pin and a second movable arm pivotally coupled to the second pin, the movable arms being located partially within said support casing and having at relevant ends arranged outside the support casing respective feelers for contacting the workpiece to be checked;
   a third arm and a fourth arm pivotally coupled to said first pin and second pin, respectively;

first and second frictional means cooperating with the third arm and the fourth arm, respectively, for frictionally restraining their pivotal movements;

transducer means comprising a first transducer including a first element coupled to the first movable arm and a second element coupled to the third arm and a second transducer including a third element coupled to the second movable arm and a fourth element coupled to the fourth arm;

means for urging the first arm and the second arm along relevant measurement directions; and zero-setting means supported by the support casing for cooperating with the first arm and the second arm, the third arm and the fourth arm, the zero-setting means including first and second movable reference and guide members, each of these members including: a movable cam movable to a first position for locking the member with respect to the support casing and to a second position for unlocking the member, reference elements for locking and unlocking the first arm and the third arm with respect to each other and, respectively, the second movable arm and the fourth arm with respect to each other, the reference and guide members permitting zero-setting displacements of the first arm and of the third arm while being mutually locked and, respectively, of the second arm and the fourth arm while being mutually locked.

17. A gauge for checking dimensions of workpieces, comprising:

a support casing;

a first pin and a second pin fixed to the support casing;

a first movable arm and a second movable arm partially arranged within the support casing, the movable arms carrying at relevant ends, arranged outside the support casing, relevant feelers for contacting the workpiece to be checked;

bearing means for pivotally coupling the movable arms to the first pin and the second pin, respectively;

a third arm and a fourth arm pivotally coupled to the first pin and the second pin, respectively, the third arm and the fourth arm being arranged within the support casing;

first and second frictional means coupled to the third arm and the first pin and the fourth arm and the second pin, respectively, for frictionally restraining the pivotal displacements of the third arm and fourth arm about the first pin and the second pin;

transducer means including: a first transducer with a first element coupled to the first movable arm and a second element coupled to the third arm; and a second transducer with a third element coupled to the second movable arm and a fourth element coupled to the fourth arm;

spring means coupled to the support means, the first arm and the second arm, for controlling pivotal movements of the first arm and second arm about the first pin and the second pin, respectively; and zero-setting means including a control shaft pivotally coupled to the support casing and a first member and a second member slidably coupled to the control shaft, each member including: locking means for locking the member with respect to the support casing upon a pivotal displacement of the control shaft; a first slot for housing second ends of the first movable arm and of the second movable arm, respectively; and a second slot for housing relevant ends of the third arm and of the fourth arm, respectively, wherein the first slot includes a first portion for housing said second end of the first arm and, respectively, of the second arm, with a play permitting measurement pivotal displacements of the first arm and the second arm, and a second portion for housing said second ends of the first arm and, respectively, of the second arm, substantially without play, the second slot defining abutment surfaces for cooperating with said relevant ends of the third arm and, respectively, of the fourth arm, whereby the first arm and the third arm and, respectively, the second arm and the fourth arm can be locked with respect to each other for zero-setting the gauge by displacing the first arm and the second arm while maintaining the first transducer and the second transducer in a pre-set condition.

* * * * *

UNITED STATES PATENT AND TRADEMARK OFFICE
CERTIFICATE OF CORRECTION

PATENT NO. : 4,473,951
DATED : October 2, 1984
INVENTOR(S) : Guido GOLINELLI and Narciso SELLERI It is certified that error appears in the above-identified patent and that said Letters Patent is hereby corrected as shown below:

On the TITLE PAGE under REFERENCES CITED, U.S. PATENT DOCUMENTS:
"Asand et al." should read --Asano et al.--.
"Beth et al." should read -- Bell et al.--.

In the SPECIFICATION:
Column 6, line 33, "Of cource" should read --Of course--.

In the CLAIMS:
Claim 9, line 4, "and" should read --the--.

Signed and Sealed this

Twenty-fifth Day of June 1985

[SEAL]

Attest:

DONALD J. QUIGG

Attesting Officer          Acting Commissioner of Patents and Trademarks